United States Patent
Lee et al.

(10) Patent No.: US 9,237,557 B2
(45) Date of Patent: Jan. 12, 2016

(54) METHOD AND APPARATUS FOR SERVICE ACCESS BARRING

(71) Applicant: LG ELECTRONICS INC., Seoul (KR)

(72) Inventors: Ki-Dong Lee, San Diego, CA (US); Sanggook Kim, San Diego, CA (US); Kiseon Ryu, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 13/936,905

(22) Filed: Jul. 8, 2013

(65) Prior Publication Data

US 2014/0010180 A1    Jan. 9, 2014

Related U.S. Application Data

(60) Provisional application No. 61/669,006, filed on Jul. 6, 2012, provisional application No. 61/813,165, filed on Apr. 17, 2013.

(51) Int. Cl.
*G08C 15/00* (2006.01)
*H04W 72/04* (2009.01)
*H04W 48/02* (2009.01)

(52) U.S. Cl.
CPC ............. *H04W 72/04* (2013.01); *H04W 48/02* (2013.01)

(58) Field of Classification Search
CPC .............................. H04W 48/02; H04W 72/04
USPC ........................ 370/229–231, 235, 236, 238, 370/395.1–395.72
See application file for complete search history.

(56) References Cited

U.S. PATENT DOCUMENTS

| | | | |
|---|---|---|---|
| 2006/0039335 A1* | 2/2006 | Ono et al. | 370/338 |
| 2007/0008902 A1 | 1/2007 | Yaramada et al. | |
| 2007/0101411 A1 | 5/2007 | Babi et al. | |
| 2009/0119773 A1 | 5/2009 | D'Amore et al. | |
| 2009/0190524 A1* | 7/2009 | Liu et al. | 370/328 |
| 2009/0201798 A1* | 8/2009 | Lee et al. | 370/216 |
| 2010/0128709 A1 | 5/2010 | Liu et al. | |
| 2013/0194998 A1* | 8/2013 | Susitaival et al. | 370/312 |
| 2013/0329550 A1* | 12/2013 | Kotecha et al. | 370/230 |

FOREIGN PATENT DOCUMENTS

JP    2009-515241 A    4/2009

OTHER PUBLICATIONS

MTC Device Supplemental Access Control, May 17-21, 2010.*
3GPP TSG GERAN #45bis, "MTC Device Supplemental Access Control", Telefon AB LM Ericsson, ST Ericsson, GP-100890, May 17-21, 2010, 3 pages.

* cited by examiner

*Primary Examiner* — Mang Yeung
(74) *Attorney, Agent, or Firm* — Birch, Stewart, Kolasch & Birch, LLP

(57) ABSTRACT

The present invention is directed to a method and an apparatus for use in a wireless communication system. Specifically, the present invention is directed to a method and an apparatus of performing a network access procedure, the method comprising: receiving system information including Application-based (APP-based) information set, wherein the APP-based information set includes one or more APP-based information subsets, and each APP-based information subset is used to control network access per application; and performing the network access procedure under control of APP-based information subset corresponding to an application that causes the network access procedure.

14 Claims, 9 Drawing Sheets

(a) RRC connection establishment, successful (b) RRC connection establishment, network reject (a) RRC connection establishment, successful (b) RRC connection establishment, network reject

METHOD AND APPARATUS FOR SERVICE ACCESS BARRING

CROSS REFERENCE TO RELATED APPLICATIONS

This application claims priority under 35 U.S.C §119(e) to U.S. Provisional Application No. 61/669,006 filed on Jul. 6, 2012, and U.S. Provisional Application No. 61/813,165 filed on Apr. 17, 2013, the entire contents of which are hereby incorporated by reference.

TECHNICAL FIELD

The present invention is directed to a method and an apparatus for use in a wireless communication system. Specifically, the present invention is directed to a method and an apparatus of access barring or access control), in particular the Service Access barring or Application and Service Access Control.

BACKGROUND ART

Generally, a wireless communication system is being developed to diversely cover a wide range to provide such communication services as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) and the like.

DISCLOSURE

Technical Problem

An object of the present invention is to provide a method and an apparatus of efficiently controlling congestion, in particular user plane congestion.

It will be appreciated by persons skilled in the art that the objectives that can be achieved through the present invention are not limited to what have been particularly described hereinabove and other objectives that the present invention can achieve will be more clearly understood from the following detailed description taken in conjunction with the accompanying drawings.

Technical Solution

As an aspect of the present invention, a method of performing a network access procedure by a User Equipment (UE) in a wireless communication system is provided, in which the method comprises: receiving system information including Application-based (APP-based) information set, wherein the APP-based information set includes one or more APP-based information subsets, and each APP-based information subset is used to control network access per application; and performing the network access procedure under control of APP-based information subset corresponding to an application that causes the network access procedure.

Preferably, the application may include at least one of a voice, a Voice over IP (VoIP), push-to-talk (PTT), an audio streaming, a video streaming, a web-browsing, an email, a file transfer, a social application and a messaging.

Preferably, the application may be defined by a mobile network operator.

Preferably, each APP-based information subset may include priority information for a corresponding application.

Preferably, the method may further comprise: receiving information indicating a threshold value for a priority level, wherein a network access by an application with a lower priority level than the threshold value is not allowed.

Preferably, each APP-based information subset may include probability information and time information used for controlling the network access.

Preferably, the performing may comprise: transmitting a Radio Resource Control (RRC) connection request message, wherein the RRC connection request message includes information identifying an application that causes a RRC connection establishment.

Preferably, the method may further comprise: receiving a RRC connection reject message, wherein the RRC connection reject message includes information indicating a time interval, wherein the time interval is used to prevent the application from restarting the network access procedure.

Preferably, the RRC connection reject message may be triggered by a mobility management entity (MME).

Preferably, the network access procedure may further comprises: receiving a RRC connection release message, wherein the RRC connection release message includes information indicating a time interval, wherein the time interval is used to prevent the application from restarting the network access procedure.

Preferably, the RRC connection release message may be triggered by a MME.

As another aspect of the invention, a User Equipment (UE) configured to perform a network access procedure in a wireless communication system is provided, in which the UE comprises: a radio frequency (RF) unit; and a processor, wherein the processor is configured: to receive system information including Application-based (APP-based) information set, wherein the APP-based information set includes one or more APP-based information subsets, and each APP-based information subset is used to control network access per application, and to perform the network access procedure under control of APP-based information subset corresponding to an application that causes the network access procedure.

Preferably, the application may include at least one of a voice, a Voice over IP (VoIP), push-to-talk (PTT), an audio streaming, a video streaming, a web-browsing, an email, a file transfer, a social application and a messaging.

Preferably, the application may be defined by a mobile network operator.

Preferably, each APP-based information subset may include priority information for a corresponding application.

Preferably, the processor may be further configured to: receive information indicating a threshold value for a priority level, wherein a network access by an application with a lower priority level than the threshold value is not allowed.

Preferably, each APP-based information subset may include probability information and time information used for controlling the network access.

Preferably, the network access procedure may comprise: transmitting a Radio Resource Control (RRC) connection request message, wherein the RRC connection request message includes information identifying an application that causes a RRC connection establishment.

Preferably, the processor may be further configured to: receive a RRC connection reject message, wherein the RRC connection reject message includes information indicating a time interval, wherein the time interval is used to prevent the application from restarting the network access procedure.

Preferably, the RRC connection reject message may be triggered by a mobility management entity (MME).

Preferably, the processor may be further configured to: receive a RRC connection release message, wherein the RRC connection release message includes information indicating a time interval, wherein the time interval is used to prevent the application from restarting the network access procedure.

Preferably, the RRC connection release message may be triggered by a MME.

Advantageous Effects

Exemplary embodiments of the present invention have the following effects. In accordance with the embodiments of the present invention, congestion, in particular user plane congestion may be efficiently controlled.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA has been implemented in wireless communication systems, such as UMTS Terrestrial Radio Access (UTRA) or CDMA2000. TDMA has been implemented in wireless communication system, for example, Global System for Mobile communications (GSM), General Packet Radio Service (GPRS), Enhanced Data rates for GSM Evolution (EDGE), etc. OFDMA has been implemented in wireless communication system, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

Specific terms used for the exemplary embodiments of the present invention are provided to aid in understanding of the present invention. These specific terms may be replaced with other terms within the scope and spirit of the present invention.

Figure 1:
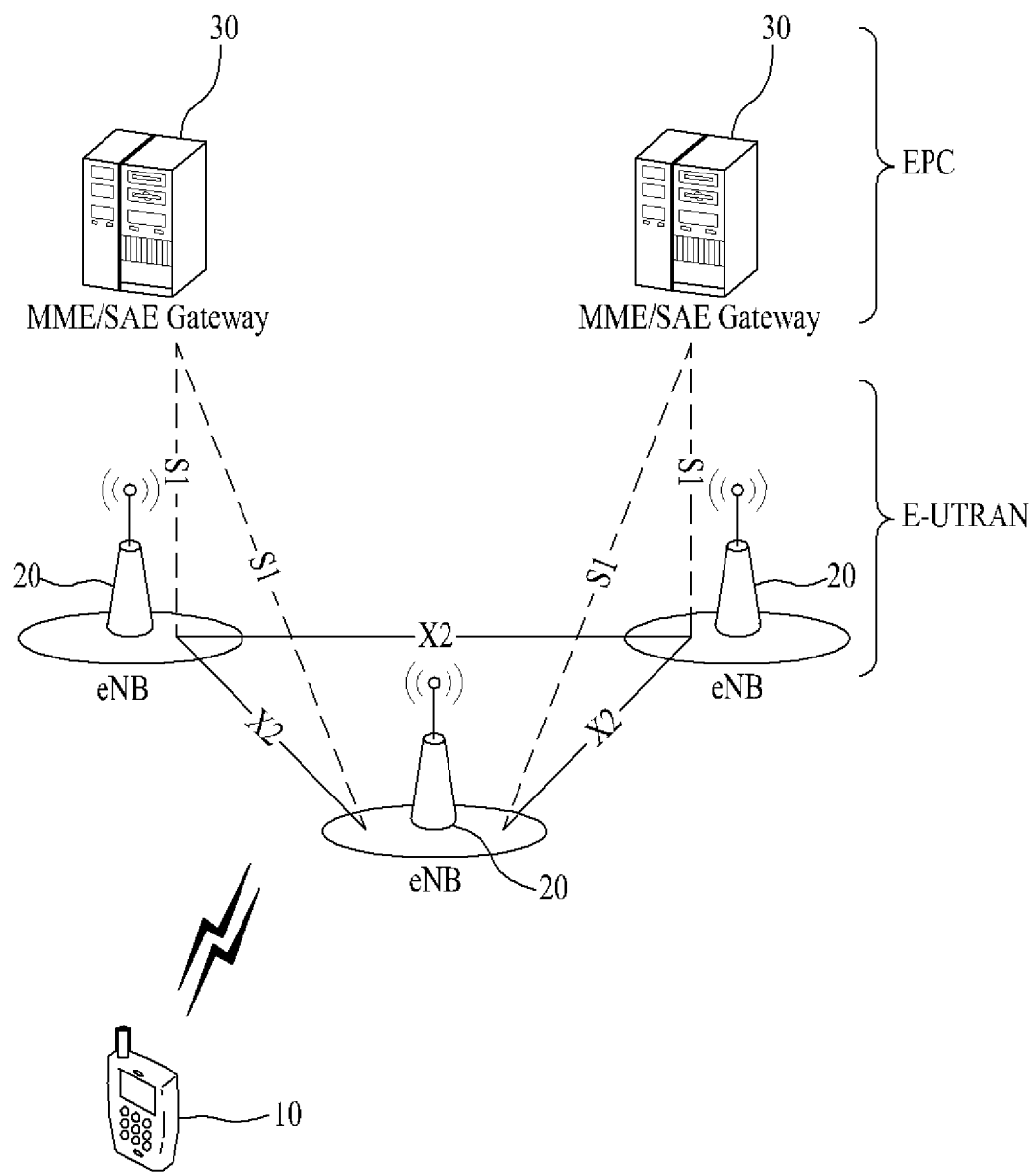
FIG. 1 illustrates a network structure of an Evolved UMTS (Universal Mobile Telecommunication System) Terrestrial Radio Access Network (E-UTRAN).

FIG. 1 illustrates a network structure of an E-UTRAN. The E-UTRAN is a part of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

Referring to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS), an Access Terminal (AT) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNB 20 and UE 10. Here, "DownLink (DL)" refers to communication from the eNB 20 to the UE 10, and "UpLink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
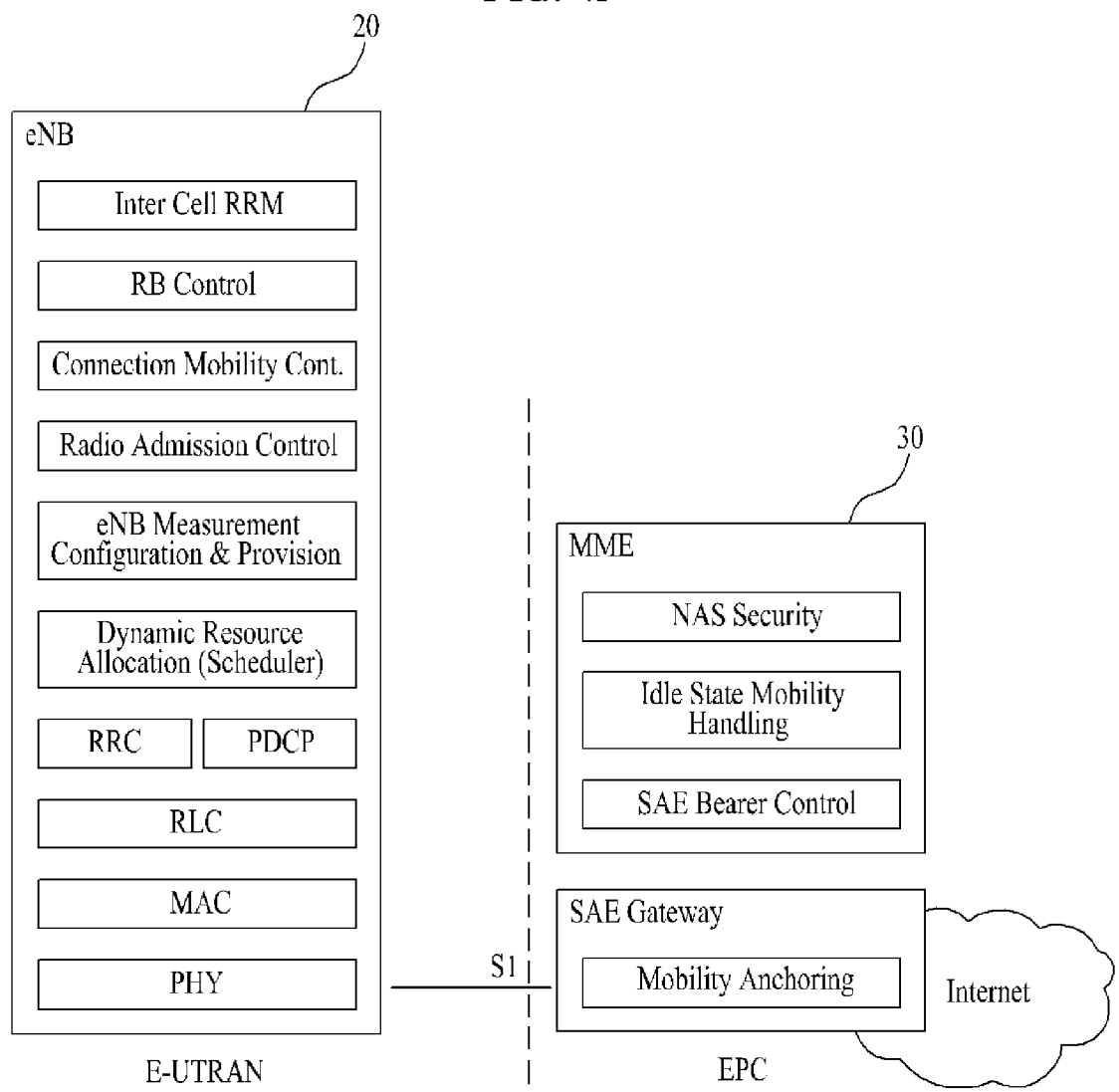
FIG. 2 illustrates a general functional structure of a typical E-UTRAN and that of a typical Evolved Packet Core (EPC).

FIG. 2 is a block diagram depicting general functional structures of an E-UTRAN and an EPC. Referring to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Control Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, SAE bearer control, and ciphering and integrity protection of NAS signaling.

Figure 3A:
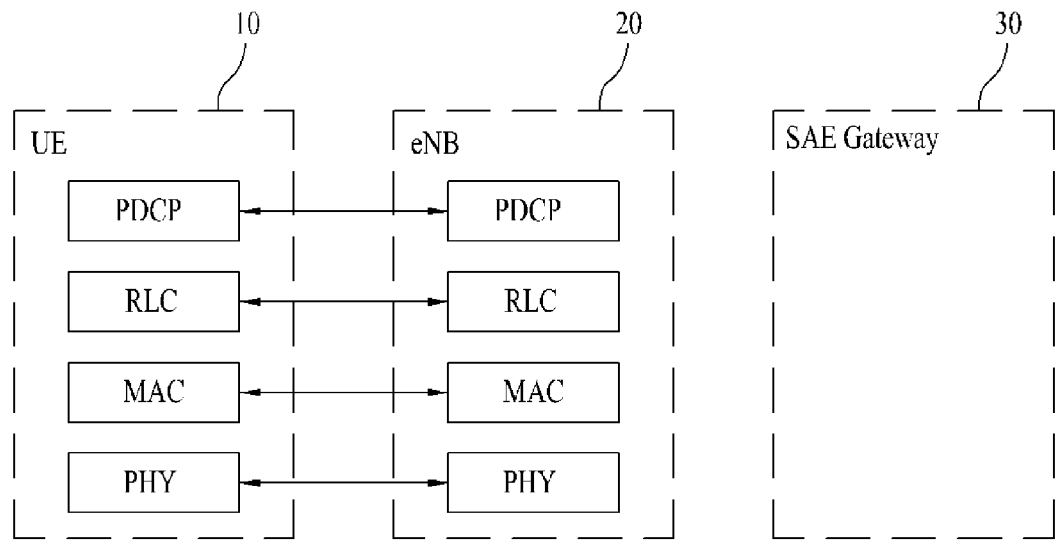
FIGS. 3A~3B illustrate a user-plane protocol and a control-plane protocol stack for the E-UMTS network
Figure 3B:
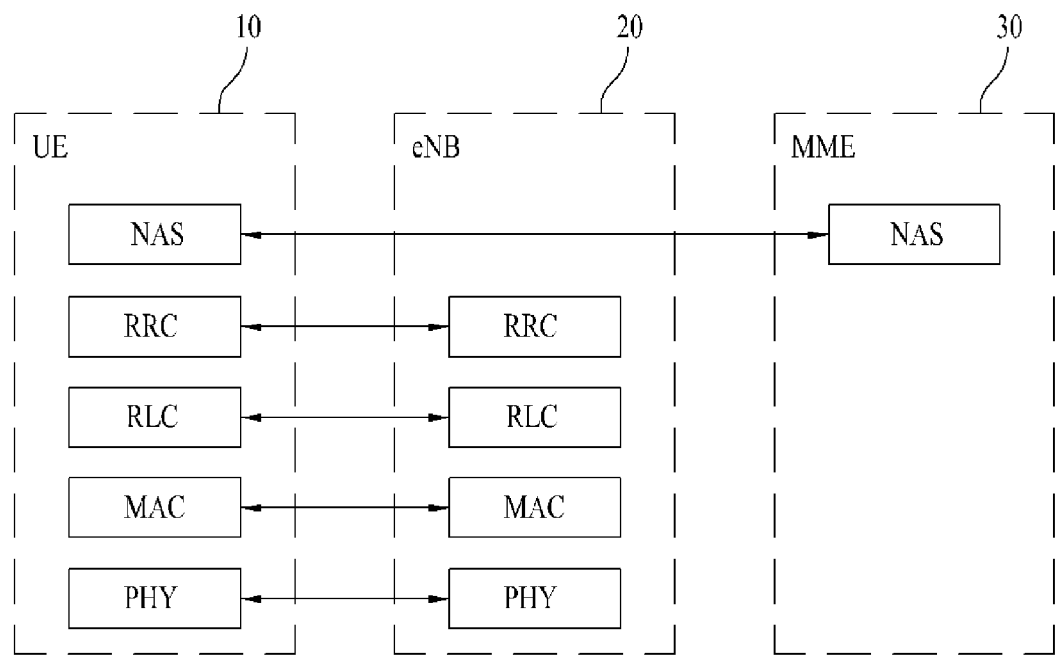

FIGS. 3A~3B illustrate the user-plane protocol and the control-plane protocol stack for the E-UMTS network. Referring to FIGS. 3A~3B, the protocol layers may be divided into a first layer (L1), a second layer (L2) and a third layer (L3) based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3A~3B as being separate from the MAC layer, it is understood that the functions of the RLC layer may be performed by the MAC layer and that, therefore, a separate RLC layer is not required. Referring to FIG. 3A, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

Referring to FIG. 3B, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN. The RB is classified into two types: Data RB (DRB) and Signaling RB (SRB). The DRB is used to carry user-plane data, and the SRB is used to carry control-plane data, e.g., Dedicated Control Channel (DCCH) signaling data. An SRB is used during connection establishment to establish the Radio Access Bearers (RABs) and then also to deliver signaling while on the connection (for example, to perform a handover, reconfiguration or release).

Referring to FIG. 3A, the RLC and MAC layers (terminated in an eNB 20 on the network side) may perform functions such as Scheduling, Automatic Repeat reQuest (ARQ), and Hybrid Automatic Repeat reQuest (HARQ). The PDCP layer (terminated in eNB 20 on the network side) may perform the user plane functions such as header compression, integrity protection, and ciphering.

Referring to FIG. 3B, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution-Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover) of the UE 10.

User equipment receives information from a base station via a downlink (DL) and transmits information to the base station via an uplink (UL) in a wireless communication system. The information transmitted between the base station and the user equipment includes data and various control information, and there may exist various physical channels according to a kind and usage of the information.

Figure 4:
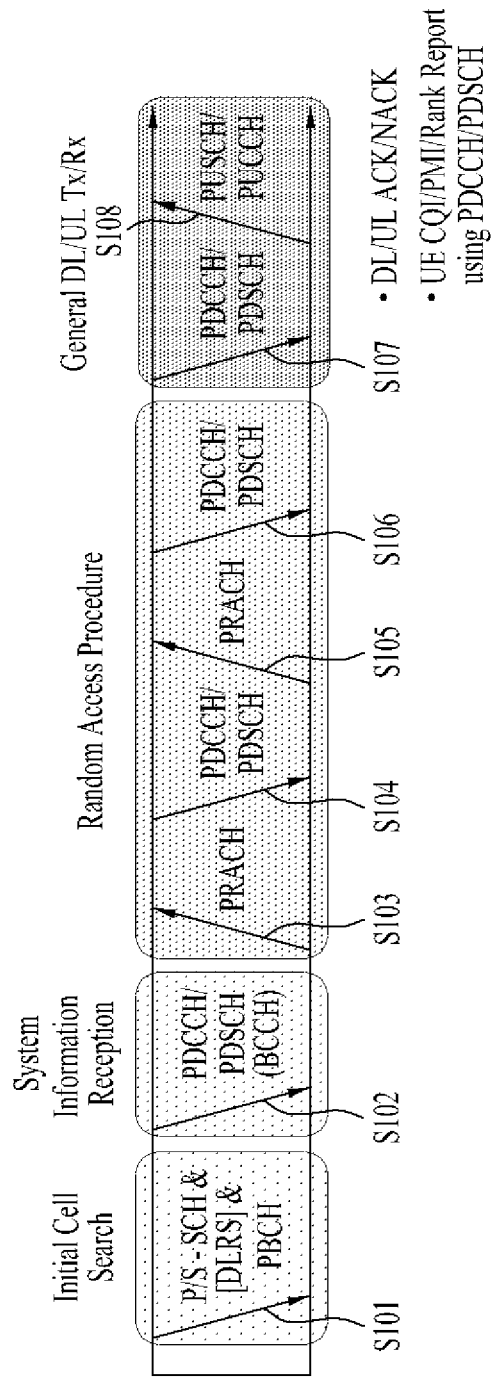
FIG. 4 illustrates a diagram for explaining an example of physical channels used for 3GPP LTE-based system and a general signal transmission method using the same.

FIG. 4 illustrates a diagram for explaining an example of physical channels used for 3GPP LTE-based system and a general signal transmission method using the same.

Referring to FIG. 4, if a power of a user equipment is turned on or the user equipment enters a new cell, the user equipment may perform an initial cell search job for matching synchronization with a base station and the like (S101). To this end, the user equipment may receive a Primary Synchronization Channel (P-SCH) and a Secondary Synchronization Channel (S-SCH) from the base station, may match synchronization with the base station and may then obtain information such as a cell ID and the like. Subsequently, the user equipment may receive a Physical Broadcast Channel (PBCH) from the base station and may be then able to obtain intra-cell broadcast information. Meanwhile, the user equipment may receive a Downlink Reference Signal (DL RS) and may be then able to check a DL channel state.

Having completed the initial cell search, the user equipment may receive a Physical Downlink Control Channel (PDCCH) and a Physical Downlink Shared Channel (PDSCH) according to the Physical Downlink Control Channel (PDCCH) and may be then able to obtain detailed system information (S102).

Meanwhile, the user equipment may be able to perform a random access procedure to complete the access to the base station (S103 to S106). To this end, the user equipment may transmit a preamble via a Physical Random Access Channel (PRACH) (S103) and may be then able to receive a response message via PDCCH and a corresponding PDSCH in response to the preamble (S104). In case of a contention based random access, it may be able to perform a contention resolution procedure such as a transmission (S105) of an additional physical random access channel and a channel reception (S106) of a physical downlink control channel and a corresponding physical downlink shared channel.

Having performed the above mentioned procedures, the user equipment may be able to perform a PDCCH/PDSCH reception (S107) and a transmission (S108) as a general uplink/downlink signal transmission procedure. Control information transmitted to a base station by a user equipment may be commonly named uplink control information (hereinafter abbreviated UCI). The UCI may include Hybrid Automatic Repeat reQuest Acknowledgement/Negative-Acknowledgement (HARQ-ACK/NACK), Scheduling Request (SR), Channel State Information (CSI), and the like. The CSI may include Channel Quality Indication (CQI), Precoding Matrix Indication (PMI), Rank Indication (RI) information and the like. In LTE-based system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 5:
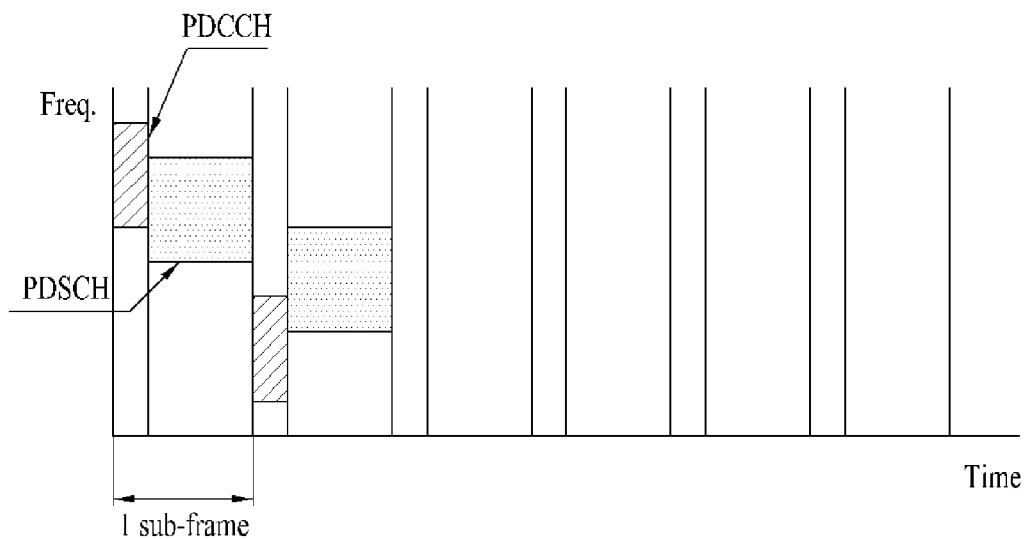
FIG. 5 illustrates a downlink subframe and physical channels.

FIG. 5 illustrates a downlink subframe and physical channels.

Referring to FIG. 5, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE/LTE-A, for example, a Physical Control Format Indicator Channel (PCFICH), a Physical Downlink Control Channel (PDCCH), a Physical Hybrid ARQ Indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

To initiate access to the network, a random access procedure is used. The random access procedure is also referred to as a Random Access Channel (RACH) procedure. Physical Random Access Channel (PRACH) transmission is under control of higher layer protocol which performs some important functions related to priority and load control. The PRACH is a common physical channel dedicated to the random access procedure. There are two kinds of RACH procedures: contention-based RACH procedure and non-contention-based RACH procedure. In the contention-based RACH procedure, many UEs can attempt to access the same base station simultaneously using the same RACH preamble/resources, which may lead to network access congestions/collisions. Hereinafter, unless mentioned otherwise, a RACH (or RA) procedure means a contention-based RACH (or RA) procedure.

A RACH procedure can be used for several purposes. For example the RACH procedure can be used to access the network, to request resources, to carry control information, to adjust the time offset of the uplink in order to obtain uplink synchronization, to adjust the transmitted power, etc.

A RACH procedure can be initiated by the UE or the eNB. The RACH procedure may, for instance, be triggered by the following events:

A UE switches from power-off to power-on and needs to be registered to the network.

A UE is not time-synchronized with an eNB and starts transmitting data (for instance the user calls).

An eNB starts transmitting data to the UE but they are not synchronized (for instance the user receives a call).

An eNB measures a delay of the received signal from the UE (for instance the user is moving and has lost synchronization).

Figure 6:
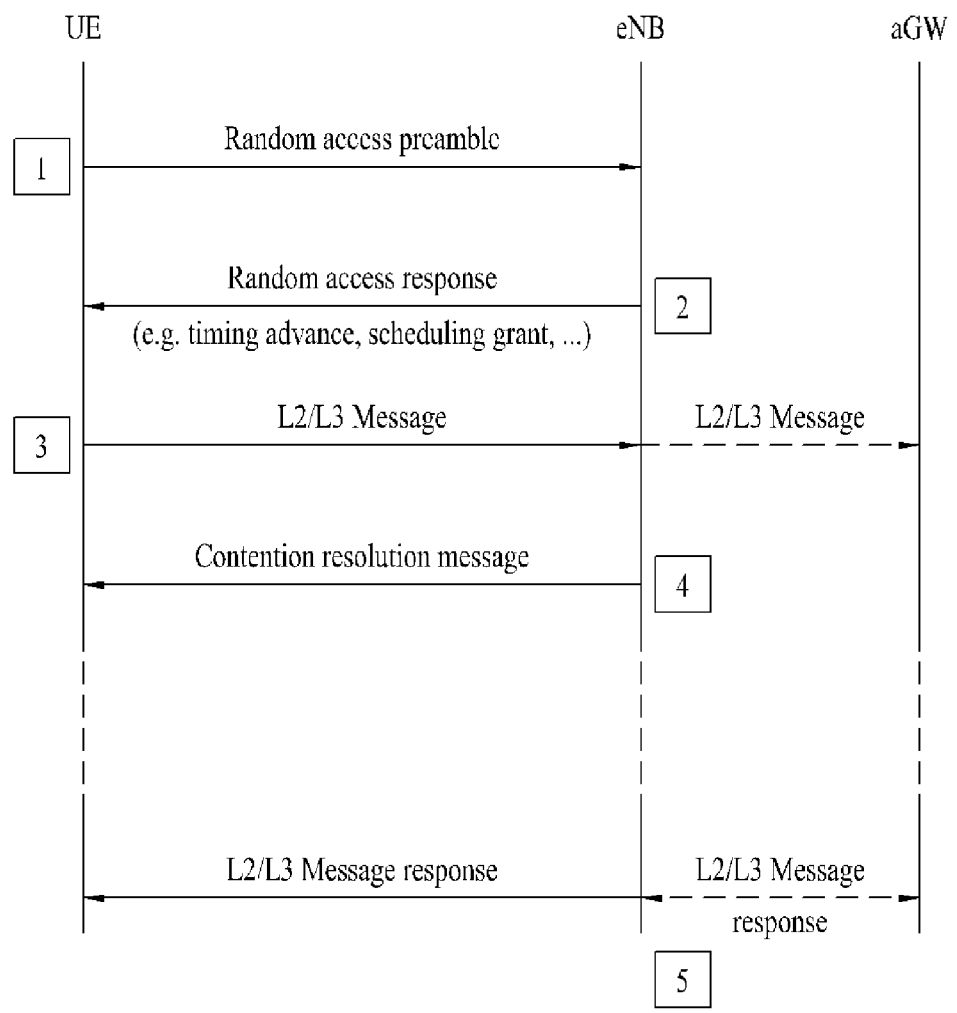
FIG. 6 illustrates a contention-based Random Access (RA) procedure.

FIG. 6 illustrates a contention-based random access procedure.

Referring to FIG. 6, firstly the UE retrieves information transmitted periodically from eNB on a downlink Broadcast Channel (BCH) and selects a preamble signature (e.g., Constant Amplitude Zero Auto-Correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command and a power-control command.

If the UE receives a random access response from the eNB, the UE decodes the random access response and adapts UL transmission timing, and UL transmission power if the random access response contains power control information. The UE then sends a resource request message (message 3, box 3) via an uplink shared channel. In the message 3, the UE requests bandwidth and time resources to transmit data and it also indicates a UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with a UE-specific signature, the eNB checks how many UEs were detected with the same signature and resolves any possible contentions. If the preamble sent by a UE was in collision with a preamble from another UE, the eNB sends a contention resolution message (message 4, box 4) to command a corresponding UE to restart the RACH procedure. If the UE was not in collision, the eNB sends a resource assignment message (message 5, box 5). Subsequent transmissions are carried out as usual.

Figure 7:
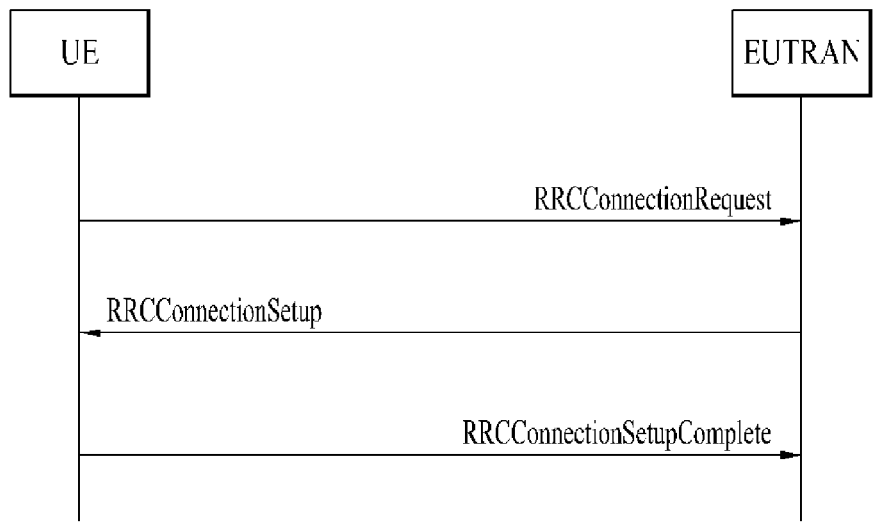
FIG. 7 illustrates a procedure of RRC connection establishment.

FIG. 7 illustrates a procedure of RRC connection establishment. The RRC connection establishment involves SRB 1 establishment. The procedure is also used to transfer the initial NAS dedicated information/message from the UE to E-UTRAN.

Referring to FIG. 7, an UE transmits a RRC connection request message to the E-UTRAN (e.g., eNB, MME). If the connection request is allowed, the E-UTRAN transmits a RRC connection setup message, and then the UE transmits a RRC connection setup complete message to the E-UTRAN. Meanwhile, if the connection request is not allowed, the E-UTRAN transmits a RRC connection reject message to the UE.

TABLE 1

RRCConnectionRequest message

```
-- ASN1START
RRCConnectionRequest ::=            SEQUENCE {
    criticalExtensions                  CHOICE {
        rrcConnectionRequest-r8             RRCConnectionRequest-r8-IEs,
        criticalExtensionsFuture            SEQUENCE { }
    }
}
RRCConnectionRequest-r12-IEs ::=    SEQUENCE {
    ue-Identity                         InitialUE-Identity,
    establishmentCause                  EstablishmentCause,
    spare                               BIT STRING (SIZE (1))
}
InitialUE-Identity ::=              CHOICE {
    s-TMSI                              S-TMSI,
    randomValue                         BIT STRING (SIZE (40))
}
EstablishmentCause ::=              ENUMERATED {
                                    emergency, highPriorityAccess, mt-Access, mo-Signalling,
                                    mo-Data, delayTolerantAccess-v1020, spare2, spare1,}
-- ASN1STOP
```

TABLE 1-continued

| RRCConnectionRequest field descriptions |
|---|
| establishmentCause |
| Provides the establishment cause for the RRC connection request as provided by the upper layers. W.r.t. the cause value names: highPriorityAccess concerns AC11 to AC15, 'mt' stands for 'Mobile Terminating' and 'mo' for 'Mobile Originating. randomValue |
| Integer value in the range 0 to $2^{40} - 1$. ue-Identity |
| UE identity included to facilitate contention resolution by lower layers. |

TABLE 2

RRCConnectionReject message

```
-- ASN1START
RRCConnectionReject ::=            SEQUENCE {
    criticalExtensions              CHOICE {
        c1                           CHOICE {
            rrcConnectionReject-r8          RRCConnectionReject-r8-IEs,
            spare3 NULL, spare2 NULL, spare1 NULL
        },
        criticalExtensionsFuture         SEQUENCE { }
    }
}
RRCConnectionReject-r8-IEs ::=      SEQUENCE {
    waitTime                         INTEGER (1..16),
    nonCriticalExtension             RRCConnectionReject-v8a0-IEs    OPTIONAL
}
RRCConnectionReject-v8a0-IEs ::= SEQUENCE {
    lateNoncriticalExtension         OCTET STRING                    OPTIONAL,-- Need OP
    nonCriticalExtension             RRCConnectionReject-v1020-IEs   OPTIONAL
}
RRCConnectionReject-v1020-IEs ::=   SEQUENCE {
    extendedWaitTime-r10             INTEGER (1..1800)  OPTIONAL,   -- Need ON
    nonCriticalExtension             SEQUENCE { }      OPTIONAL    -- Need OP
}
-- ASN1STOP
```

| RRCConnectionReject field descriptions |
|---|
| extendedWaitTime |
| Value in seconds for the wait time for Delay Tolerant access requests. waitTime |
| Wait time value in seconds. |

Figure 8:
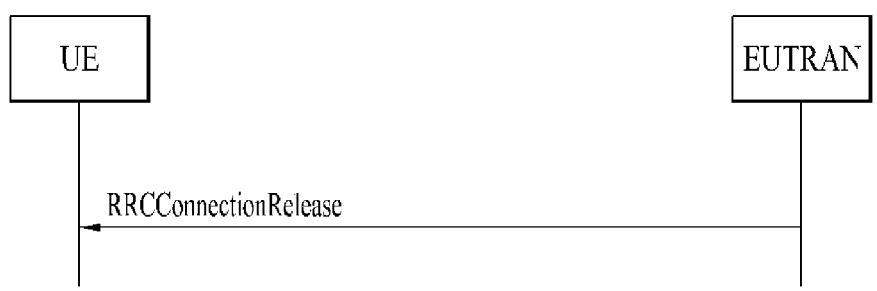
FIG. 8 illustrates a procedure of RRC connection release.

FIG. 8 illustrates a procedure of RRC connection release. The RRC connection release includes release of the established radio bearers as well as all radio resources. Referring to FIG. 8, E-UTRAN transmits a RRC connection release message to an UE.

TABLE 3

RRCConnectionRelease message

```
-- ASN1START
RRCConnectionRelease ::=           SEQUENCE {
    rrc-TransactionIdentifier        RRC-TransactionIdentifier,
    criticalExtensions               CHOICE {
        c1                            CHOICE {
            rrcConnectionRelease-r8         RRCConnectionRelease-r8-IES,
            spare3 NULL, spare2 NULL, spare1 NULL
        },
        criticalExtensionsFuture         SEQUENCE { }
    }
}
(omitted for presentation)
RRCConnectionRelease-v1020-IEs ::=   SEQUENCE {
```

TABLE 3-continued

```
    extendedWaitTime-r10            INTEGER (1..1800)  OPTIONAL,  -- Need ON
    nonCriticalExtension            SEQUENCE { }       OPTIONAL   -- Need OP
}
ReleaseCause ::=    ENUMERATED {loadBalancingTAUrequired,
                                other, cs-FallbackHighPriority-v1020, spare1}
(omitted for presentation)
-- ASN1STOP
```

| RRCConnectionRelease field descriptions |
|---|
| extendedWaitTime |
| Value in seconds for the wait time for Delay Tolerant access requests. |
| releaseCause |
| The releaseCause is used to indicate the reason for releasing the RRC Connection. The cause value cs-FallbackHighPriority is only applicable when redirectedCarrierInfo is present with the value set to utra-FDD or utra-TDD. E-UTRAN should not set the releaseCause to loadBalancingTAURequired or to cs-FallbackHighPriority if the extendedWaitTime is present. |

In 3GPP, various solutions have been employed for overload control: e.g., Access Class Barring (ACB), Service Specific Access Control (SSAC), and Extended Access Barring (EAB).

Access Class Barring (ACB)

Access barring may be performed during connection establishment and provides a means to control the load introduced by UE-originating traffic. There are separate means for controlling Mobile Originating (MO) calls and MO signaling. All UEs are members of one out of ten randomly allocated mobile populations, defined as Access Classes (ACs) 0 to 9. The population number is stored in the Subscriber Identity Module/Universal Subscriber Identity Module (SIM/USIM). In addition, UEs may be members of one or more out of 5 special categories (Access Classes 11 to 15), also held in the SIM/USIM. These are allocated to specific high priority users as follows. (The enumeration is not meant as a priority sequence):

Class 15—Public Land Mobile Network (PLMN) Staff;
Class 14—Emergency Services;
Class 13—Public Utilities (e.g. water/gas suppliers);
Class 12—Security Services;
Class 11—For PLMN Use.

In case of an overload situation like emergency or congestion, the network may want to reduce the access overload in the cell. To reduce the access from the UE, the network may modify SystemInformationBlockType2 (SIB2) that contains access barring related parameters.

TABLE 4

SystemInformationBlockType2 information element

```
-- ASN1START
SystemInformationBlockType2 ::=    SEQUENCE {
    ac-BarringInfo                     SEQUENCE {
        ac-BarringForEmergency             BOOLEAN,
        ac-BarringForMO-Signalling         AC-BarringConfig        OPTIONAL,-- Need OP
        ac-BarringForMO-Data               AC-BarringConfig        OPTIONAL -- Need OP
    }                                                              OPTIONAL,-- Need OP
    radioResourceConfigCommon          RadioResourceConfigCommonSIB,
    ue-TimersAndConstants              UE-TimersAndConstants,
    freqInfo                           SEQUENCE {
        ul-CarrierFreq                     ARFCN-ValueEUTRA        OPTIONAL,-- Need OP
        ul-Bandwidth                       ENUMERATED {n6, n15, n25, n50, n75, n100}
                                                                   OPTIONAL, - Need OP
        additionalSpectrumEmission         AdditionalSpectrumEmission
    },
    mbsfn-SubframeConfigList           MBSFN-SubframeConfigList    OPTIONAL,-- Need OR
    timeAlignmentTimerCommon           TimeAlignmentTimer,
    ...,
    lateNonCriticalExtension           OCTET STRING               OPTIONAL,-- Need OP
    [[ ssac-BarringForMMTEL-Voice-r9     AC-BarringConfig         OPTIONAL,-- Need OP
        ssac-BarringForMMTEL-Video-r9    AC-BarringConfig         OPTIONAL -- Need OP
    ]],
    [[ ac-BarringForCSFB-r10             AC-BarringConfig         OPTIONAL  -- Need OP
    ]]
}
    (Omitted)
AC-BarringConfig ::=               SEQUENCE {
    ac-BarringFactor                   ENUMERATED {
                                           p00, p05, p10, p15, p20, p25, p30, p40,
                                           p50, p60, p70, p75, p30, p85, p90, p95},
```

TABLE 4-continued

| | |
|---|---|
| ac-BarringTime | ENUMERATED {s4, s8, s16, s32, s64, s128, s256, s512}, |
| ac-BarringForSpecialAC | BIT STRING (SIZE (5)) |
| } | |
| MBSFN-SubframeConfigList ::=<br>SubframeConfig<br>-- ASN1STOP | SEQUENCE (SIZE (1..maxMBSFN-Allocations)) OF MBSFN- |

SystemInformationBlockType2 field descriptions ac-BarringFactor

If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than 'p00' can only be set if all bits of the corresponding ac-BarringForSpecialAC are set to 0.
ac-BarringForCSFB Access class barring for mobile originating CS fallback.
ac-BarringForEmergency Access class barring for AC 10.
ac-BarringForMO-Data Access class barring for mobile originating calls.
ac-BarringForMO-Signalling Access class barring for mobile originating signalling.
ac-BarringForSpecialAC Access class barring for AC 11-15. The first/leftmost bit is for AC 11, the second bit is for AC 12, and so on.
ac-BarringTime Mean access barring time value in seconds.
ssac-BarringForMMTEL-Video Service specific access class barring for MMTEL video originating calls.
ssac-BarringForMMTEL-Voice Service specific access class barring for MMTEL voice originating calls.

For regular users with AC 0 to 9, their access is controlled by ac-BarringFactor and ac-BarringTime. For example, if the UE with AC 0 to 9 initiates a Mobile Originating (MO) call, the UE generates a random number. If the random number is lower than the probability factor (ac-BarringFactor), access is not barred. Otherwise access is barred for a duration which is randomly selected centered on the broadcast barring timer value (persistent test). By setting ac-BarringFactor to a lower value, the access from regular user is restricted (UE must generate a "random number" that is lower than the threshold in order to access) while priority users with AC 11 to 15 can access without any restriction For users initiating emergency calls (AC 10), their access is controlled by ac-BarringForEmergency—Boolean value: barring or not For UEs with AC 11-15, their access is controlled by ac-BarringForSpecialAC—boolean value: barring or not.

The network (E-UTRAN) may support access control based on the type of access attempt (i.e. Mobile Originating (MO) data or MO signaling), in which indications to the UEs are broadcasted to guide the behavior of UE. A "mean duration of access control" and a barring rate are broadcasted for each type of access attempt.

Service Specific Access Control (SSAC)

In an emergency situation, like Earthquake or Tsunami, degradation of quality of service may be experienced. Degradation in service availability and performance can be accepted in such situations, but mechanisms are desirable to minimize such degradation and maximize the efficiency of the remaining resources. When Domain Specific Access Control (DSAC) mechanism was introduced for UMTS, the original motivation was to enable Packet Switched (PS) service continuation during congestion in Circuit Switched (CS) nodes in the case of major disaster like an Earthquake or a Tsunami. In fact, the use case of DSAC in real UMTS deployment situation has been to apply access control separately on different types of services, such as voice and other packet-switched services. For example, people's psychological behavior is to make a voice call in emergency situations and it is not likely to change. Hence, a mechanism will be needed to separately restrict voice calls and other services.

However, the Evolved Packet Core (EPC) in E-UMTS is a PS-domain only system, thus DSAC access control does not apply. In this regard, considering the characteristics of voice and non-voice calls in the EPC, the SSAC is introduced to restrict the voice calls and non-voice calls separately. The SSAC is used to apply independent access control for Multimedia Telephony services (MMTEL) for mobile originating session requests from idle-mode. Under some circumstances (e.g. the terrorist attack in London on the 7 of July in 2005), overload access control may be invoked giving access only to authorities or a predefined set of users.

For example, the EPC is able to provide a capability to assign a service probability factor for each of MMTEL voice and MMTEL video:

assign a barring rate (percentage) commonly applicable for Access Classes 0 to 9 assign a flag barring status (barring or not) for each Access Class in the range 11 to 15.

SSAC is not applied to Access Class 10.

SSAC can be provided by a Visited Public Land Mobile Network (VPLMN) based on operator policy without accessing a Home Public Land Mobile Network (HPLMN).

SSAC may provide mechanisms to minimize service availability degradation (i.e. radio resource shortage) due to the mass simultaneous mobile originating session requests and maximize the availability of the wireless access resources for non-barred services.

Access control for CSFB provides a mechanism to prohibit UEs to access E-UTRAN to perform CSFB. It minimizes service availability degradation (i.e. radio resource shortage, congestion of fallback network) caused by mass simultaneous mobile originating requests for CSFB and increases the availability of the E-UTRAN resources for UEs accessing other services. When an operator determines that it is appropriate to apply access control for CSFB, the network may broadcast necessary information to provide access control for CSFB for each class to UEs in a specific area. The network shall be able to separately apply access control for CSFB, SSAC and enhanced Access control on E-UTRAN.

Extended Access Barring (EAB)

The EAB is a mechanism for the operator(s) to control mobile originating access attempts from UEs that are configured for EAB in order to prevent overload of the access network and/or the core network. In congestion situations, the operator can restrict access from UEs configured for EAB while permitting access from other normal UEs. A typical use case for the EAB mechanism is a Machine Type Communications (MTC) device. These MTC devices run applications generating data that is typically delay tolerant and thus perceived as low priority traffic by the mobile network. Furthermore, it is expected that the MTC devices are deployed in high numbers, thus making overload situations more common.

EXAMPLE

Application-Based Congestion Control

Mobile operators are seeing significant increases in user data traffic. For some operators, user data traffic has more than doubled annually for several years. Although the data capacity of networks has increased significantly, the observed increase in user traffic continues to outpace the growth in capacity. This is resulting in increased network congestion and in degraded user service experience. Reasons for this growth in traffic include the rapidly increasing use of "smart phones" and the proliferation of data applications that they support, and the use of USB modem dongles for laptops to provide mobile (or at least nomadic) Internet access using 3GPP networks. As the penetration of these terminals increases worldwide, this trend of rapidly increasing data traffic is expected to continue and accelerate.

Presently, network operators invest in additional network capacity (network entities and connectivity resources) as user data traffic increases and causes user plane congestion. This additional investment is becoming increasingly costly due to the rapid and continuing increases in user data traffic. From a Capital Expenditure (CAPEX) or Operating Expenses (OPEX) perspective, this approach is not sufficient. It is therefore necessary to study approaches and mechanisms to manage user plane congestion.

Scenarios that will be considered include handling of user plane traffic when Radio Access Network (RAN) congestion occurs based on:

The subscription of the user;
The type of application;
The type of content.

If suitable measure to prevent UEs from coming into the system that is experiencing User Plane (UP) congestion is not provided, UP congestion can be complicated. For example, the time period of UP congestion can be elongated. In order to alleviate UP congestion, existing measures can be considered to prevent this complication. One example is to use "RRC Rejection with Cause" for UEs that try to make RRC connections. However, most of UEs will receive "RRC Reject with Cause (RAN Congestion)", thus unnecessary waste of resources (power, bandwidth, etc.) entailing by requesting "RRC Connection Request" will incur. After receiving "RRC Reject with Cause", UE may restart the access procedure or stay until UP congestion is relieved. If UE restarts the access procedure, additional UE power consumption will be occurred. If UE decides to stay, the number of UEs waiting for the relieving of UP congestion will be increased, and thus the chance of another UP congestion in later time will be increased. Hence, by appropriately preventing UEs from attempting even for initial access, unnecessary waste of valuable resources (UE power, bandwidth, etc.) and/or other chance of UP congestion in later time due to many UEs waiting for RRC connection can be prevented.

In order to address above problems, the present invention proposes to prevent probable congestion to come and to manage ongoing congestion per application, e.g., based on application types (or application categories), such as voice, video streaming, and so on. In the present invention, when a network is congested, or is expected to get congested, the network may apply certain control methods to the (potential chance of) UP congestion if appropriate user plane traffic (e.g., application) can be selected in order to manage the (potential chance of) congestion. The selection may be based on attributes of traffic, application of content, and subscription of use. In addition, since UE knows which application/service requests initial access attempts, the UE can refrain from accessing a network (e.g., RAN) when the network is experiencing UP congestion, based on information from an eNB if the information is properly devised. Thus, for example, Application based (Prior) Notice related to User Plane (UP) congestion can be provided. The application based notice related to UP congestion can be signaled via a system information block, a RRC message. For convenience, the proposed access control method may be referred to Application Specific Access Control (ASAC) in the description. In addition, the term "application" may be interchanged with application type, application category, application group, etc. The term "service" may mean a service related to application, e.g., an application-specific service, an application-based service or a service of an application.

Figure 9:
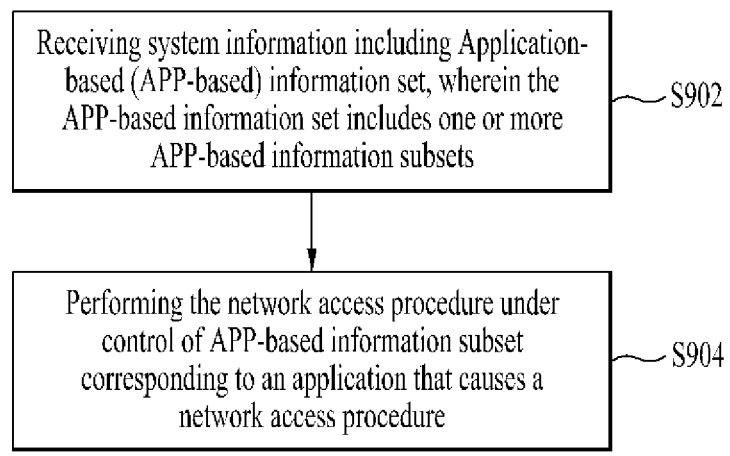
FIG. 9 illustrates an example of controlling congestion in user plane in accordance with the present invention.

FIG. 9 illustrates an example of controlling congestion in user plane in accordance with the present invention. FIG. 9 shows a procedure of congestion control at a UE side. A procedure of congestion control at an eNB side can be performed in a corresponding way.

Referring to FIG. 9, a UE may receive system information including Application-based (APP-based) information set (S902). The APP-based information set may be received through a RRC message. The APP-based information set may include one or more APP-based information subsets, each of which may be used to control network access per application. The application may include at least one of a voice, a Voice over IP (VoIP), a push-to-talk (PTT), a streaming (e.g., an audio streaming, a video streaming), a web-browsing, an email, a file transfer, a social application and a messaging.

Depending on the Service Provider's policy, Application-based access parameters may vary. Even for the same type of application, UE may be accommodated with different priorities between service providers. For example, a big service provider may build up and apply a relatively stringent accommodation policy than the other small service providers can do. In such cases, it is more preferable that an Application-based service profile is signaled. Doing so is also beneficial when a load situation changes over time even within the same service provider. Thus applications for congestion control may be defined by mobile network operators, and can be signaled through a message, e.g., System Information Block Type X1 (SIB x1).

TABLE 5

Example of Application Category Code and Type mapping (SIBx1)

| App Category Code | App Type | Note |
|---|---|---|
| 0000 | Voice | The highest priority |
| 0001 | Streaming | The 2$^{nd}$ highest |
| 0010 | Web browsing | ... |
| ... | ... | |
| 1110 | Reserved (TBD) | |
| 1111 | Reserved (TBD) | |

Each of APP-based information subsets may include priority information for a corresponding application. The UE may further receive information indicating a threshold value for a priority level, wherein a network access by an application with a lower priority level than the threshold value is not allowed. Each of APP-based information subsets may include probability information and/or time information used for controlling the network access. In this case, for an application that causes a network access, the UE may draw a random number. If the random number is lower (or, higher) than a probability value indicated by the probability information, the network access is not barred. Otherwise, the network access is barred.

TABLE 6

Example of APP-based information set

| Application | Access information (e.g., probability, priority, waiting time) |
|---|---|
| Voice | value A |
| Streaming | value B |
| Web browsing | value C |

After receipt of the APP-based information set, the UE may perform a network access procedure under control of APP-based information subset corresponding to an application that causes the network access procedure (S904). As an example, if the streaming causes a network access procedure, the network access procedure is controlled by using the value B. As another example, a threshold value of Application Category Code may be signaled. In that case, if the received threshold value is greater than or equal to the Application Category Code of an application to be initiated, then the UE does not perform, for the application, a RACH procedure for initial access.

Performing the network access procedure may comprise: transmitting a RRC connection request message, wherein the RRC connection request message includes information identifying an application that causes a RRC connection establishment. The UE may further receive a RRC connection reject message, wherein the RRC connection reject message includes information indicating a time interval (e.g., wait time) used to prevent the application from restarting the network access procedure. The RRC connection reject message may be triggered by a Mobility Management Entity (MME). The UE may further receive a RRC connection release message, wherein the RRC connection release message includes information indicating a time interval (e.g., wait time) used to prevent the application from restarting the network access procedure. The RRC connection release message may be triggered by a MME.

Figure 10:
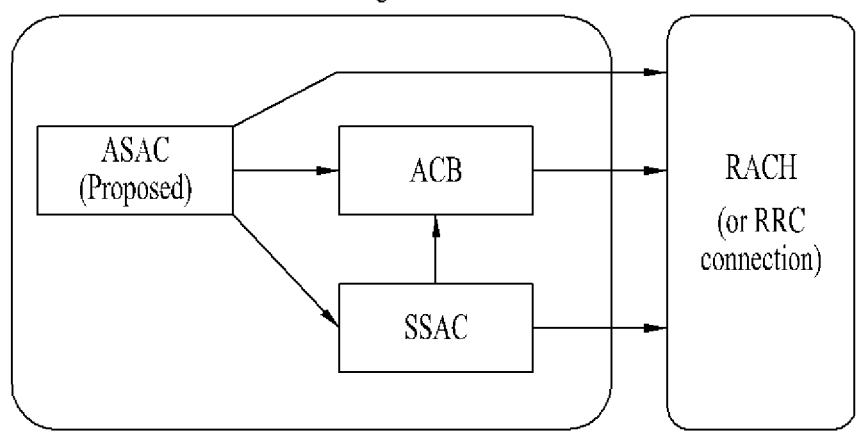
FIG. 10 illustrates another example of controlling congestion in user plane in accordance with the present invention.

FIG. 10 illustrates another example of controlling congestion in user plane in accordance with the present invention. Referring to FIG. 10, the proposed congestion control scheme (i.e., ASAC) can be used with other congestion control schemes in combination. In addition, the proposed congestion control can be performed before a RACH procedure or during a connection establishment. For example, the ASAC can be used with the ACB and/or the SSAC as follows.

Case 1: ASAC only, then RACH (or RRC connection) procedure.

Case 2: ASAC=>ACB, then RACH (or RRC connection) procedure.

Case 3: ASAC=>SSAC, then RACH (or RRC connection) procedure.

Case 4: ASAC=>SSAC=>ACB, then RACH (or RRC connection) procedure.

For congestion control before the RACH procedure, APP-based access information can be broadcast via system information, particularly a system information block. For example, the APP-based access information may be included in SIB2. Alternatively, Boolean indication representing a presence of APP-based access information is included in SIB2, and actual APP-based access information may be included in another SIB (hereinafter, SIBx2), as shown in Tables 7~8. In this case, if "app-barringIndicator" in SIB2 is ON, then UE may read SIBx2.

TABLE 7

SystemInformationBlockType2 information element (Proposed)

```
-- ASN1START
SystemInformationBlockType2 ::=    SEQUENCE {
    ac-BarringInfo                     SEQUENCE {
        ac-BarringForEmergency             BOOLEAN,
        ac-BarringForMO-Signalling         AC-BarringConfig    OPTIONAL,-- Need OP
        ac-BarringForMO-Data               AC-BarringConfig    OPTIONAL -- Need OP
    }                                                          OPTIONAL,-- Need OP
    radioResourceConfigCommon          RadioResourceConfigCommonSIB,
    ue-TimersAndConstants              UE-TimersAndConstants,
    freqInfo                           SEQUENCE {
        ul-CarrierFreq                     ARFCN-ValueEUTRA    OPTIONAL,-- Need OP
        ul-Bandwidth                       ENUMERATED {n6, n15, n25, n50, n75, n100}
                                                               OPTIONAL,-- Need OP
```

TABLE 7-continued

SystemInformationBlockType2 information element (Proposed)

```
            additionalSpectrumEmission      AdditionalSpectrumEmission
        },
        mbsfn-SubframeConfigList            MBSFN-SubframeConfigList    OPTIONAL,-- Need OR
        timeAlignmentTimerCommon            TimeAlignmentTimer,
        ...,
        lateNonCriticalExtension            OCTET STRING                OPTIONAL,-- Need OP
        [[ ssac-BarringForMMTEL-Voice-r9    AC-BarringConfig            OPTIONAL,-- Need OP
            ssac-BarringForMMTEL-Video-r9   AC-BarringConfig            OPTIONAL -- Need OP
        ]],
        [[ ac-BarringForCSFB-r10            AC-BarringConfig            OPTIONAL   -- Need OP
        ]]
        app-barringIndicator                BOOLEAN
    }
    (Omitted)
AC-BarringConfig ::=                SEQUENCE {
    ac-BarringFactor                    ENUMERATED {
                                            p00, p05, p10, p15, p20, p25, p30, p40,
                                            p50, p60, p70, p75, p80, p85, p90, p95},
    ac-BarringTime                      ENUMERATED {s4, s8, s16, s32, s64, s128, s256, s512},
    ac-BarringForSpecialAC              BIT STRING (SIZE (5))
}
MBSFN-SubframeConfigList ::=        SEQUENCE (SIZE (1..maxMBSFN-Allocations)) OF MBSFN-
SubframeConfig
-- ASN1STOP
```

TABLE 8

SystemInformationBlockTypeX2 (SIBx2) information element (Proposed)

```
-- ASN1START
SystemInformationBlockTypeX2 ::=    SEQUENCE {
    app-BarringInfo                     SEQUENCE {
        app-BarringForMO-Signalling         APP-BarringConfig           OPTIONAL,-- Need OP
        app-BarringForMO-Data               APP-BarringConfig           OPTIONAL -- Need OP
    }                                                                   OPTIONAL,-- Need OP
}
APP-BarringConfig ::=       SEQUENCE {
    app-BarringFactorApp0000                ENUMERATED {
                                                p00, p05, p10, p15, p20, p25, p30, p40,
                                                p50, p60, p70, p75, p80, p85, p90, p95},
    app-BarringTime                     ENUMERATED {s4, s8, s16, s32, s64, s128, s256, s512},
    ... // for App0001, App0010, ...
    app-BarringFactorApp1111                ENUMERATED {
                                                p00, p05, p10, p15, p20, p25, p30, p40,
                                                p50, p60, p70, p75, p80, p85, p90, p95},
    app-BarringTime                     ENUMERATED {s4, s8, s16, s32, s64, s128, s256, s512},
}
-- ASN1STOP
```

SystemInformationBlockTypeX2 (SIBx2) field descriptions app-BarringFactorAppxxxx .Can be used as a barring factor as in ac-BarringFactor. That is, if
the random number drawn by the UE is lower than this value, access is
allowed. Otherwise the access is barred. The values are interpreted
in the range [0, 1): p00 = 0, p05 = 0.05, p10 = 0.10, . . . ,
p95 = 0.95. Values other than p00 can only be set if all bits
of the corresponding ac-BarringForSpecialAC are set to 0.
app-BarringTime . .Can be used as a barring time as in ac-BarringTime. That is, it may
mean access barring time value in seconds.

In SIBx2, depending on the number of Application Types, it can include only Application Types necessary to inform UEs.

Figure 11:
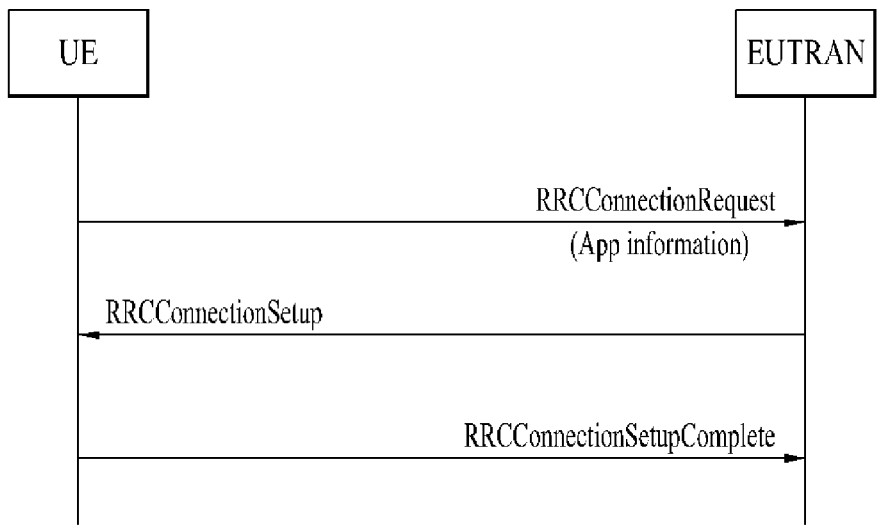
FIG. 11 illustrates another example of controlling congestion in user plane in accordance with the present invention.
Figure 11:
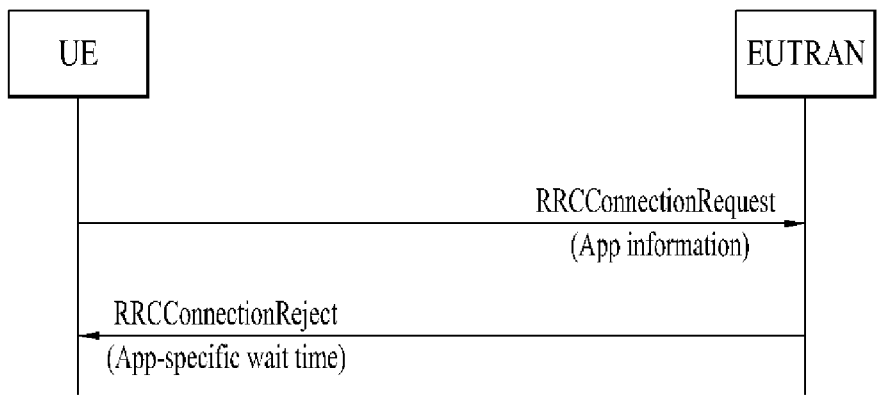
Figure 12:
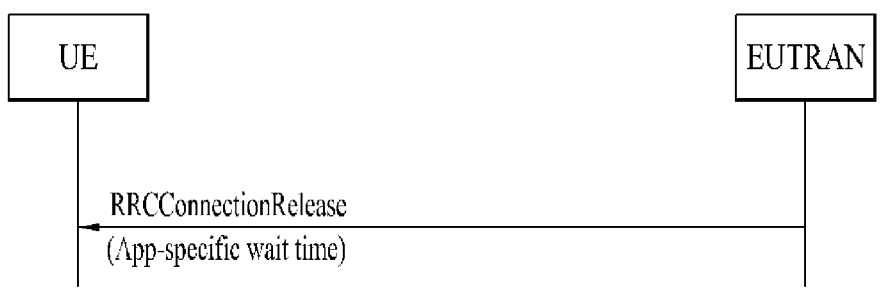
FIG. 12 illustrates another example of controlling congestion in user plane in accordance with the present invention.

FIGS. 11~12 illustrate examples of controlling congestion in user plane in accordance with the present invention. FIG. 11 and FIG. is a procedure of RRC connection establishment, and FIG. 12 is a procedure of RRC connection release. According to the present invention, the RRC connection request message, the RRC connection reject message, and the RRC connection release message may be modified as follows.

TABLE 9

RRCConnectionRequest message (proposed)

```
-- ASN1START
RRCConnectionRequest ::=            SEQUENCE {
    criticalExtensions                  CHOICE {
        rrcConnectionRequest-r8             RRCConnectionRequest-r8-IEs,
        criticalExtensionsFuture        SEQUENCE { }
    }
}
RRCConnectionRequest-r12-IEs ::=    SEQUENCE {
    ue-Identity                         InitialUE-Identity,
    establishmentCause                  EstablishmentCause,
    spare                               BIT STRING (SIZE (1))
    mo-app                              MoApp,
}
InitialUE-Identity ::=              CHOICE {
    s-TMSI                              S-TMSI,
    randomValue                         BIT STRING (SIZE (40))
}
EstablishmentCause ::=              ENUMERATED (
                                    emergency, highPriorityAccess, mt-Access, mo-Signalling,
                                    mo-Data, delayTolerantAccess-v1020, spare2, spare1,}
MoApp ::= CHOICE {
    appCat   Voice, Streaming, Web browsing,
}
-- ASN1STOP
```

The term "MoApp" stands for "Mobile-originating Application". The MoApp is used for UE to notify the eNB of the (type of) application of the traffic which the UE will transmit. For example, if the application of the traffic is for "voice", the UE can indicate that using the MoApp setting. The field for MoApp in the Proposed RRCConnectionRequest message is one of possible examples that can implement the present invention.

For those connections just getting into RRC Connected status or ongoing in RRC Connected status, if User Plane (UP) is congested, the RRC connection reject message or the RRC connection release message can be signaled by a network. In those messages, it is proposed to specify "furtherExtendedWaitTime", as shown in Tables 10~11.

TABLE 10

RRCConnectionReject message (proposed)

```
-- ASN1START
RRCConnectionReject ::=                 SEQUENCE {
    criticalExtensions                      CHOICE {
        c1                                      CHOICE {
            rrcConnectionReject-r8                  RRCConnectionReject-r8-IEs,
            spare3 NULL, spare2 NULL, spare1 NULL
        },
        criticalExtensionsFuture            SEQUENCE { }
    }
}
RRCConnectionReject-r8-IEs ::=          SEQUENCE {
    waitTime                                INTEGER (1..16),
    nonCriticalExtension                    RRCConnectionReject-v8a0-IEs    OPTIONAL
}
RRCConnectionReject-v8a0-IEs ::= SEQUENCE {
    lateNonCriticalExtension                OCTET STRING                    OPTIONAL,-- Need OP
    nonCriticalExtension                    RRCConnectionReject-v1020-IEs   OPTIONAL
}
RRCConnectionReject-v1020-IEs ::=       SEQUENCE {
    extendedWaitTime-r10                    INTEGER (1..1800)   OPTIONAL,   -- Need ON
    nonCriticalExtension                    SEQUENCE { }        OPTIONAL    -- Need OP
    furtherExtendedWaitTime-r12             INTEGER (1..N)      OPTIONAL,   -- Need ON
}
-- ASN1STOP
```

TABLE 10-continued

RRCConnectionReject field descriptions extendedWaitTime

Value in seconds for the wait time for Delay Tolerant access requests.
waitTime

Wait time value in seconds.
furtherExtendedWaitTime

Value in seconds for the wait time for Application-specific access
control. (N can be 1800 or integer)

TABLE 11

RRCConnectionRelease message (proposed)

```
-- ASN1START
RRCConnectionRelease ::=           SEQUENCE {
    rrc-TransactionIdentifier          RRC-TransactionIdentifier,
    criticalExtensions                 CHOICE {
        c1                                 CHOICE {
            rrcConnectionRelease-r8            RRCConnectionRelease-r8-IEs,
            spare3 NULL, spare2 NULL, spare1 NULL
        },
        criticalExtensionsFuture           SEQUENCE { }
    }
}
(omitted for presentation)
RRCConnectionRelease-v1020-IEs ::=  SEQUENCE {
    extendedWaitTime-r10               INTEGER (1..1800)    OPTIONAL, -- Need ON
    nonCriticalExtension               SEQUENCE { }         OPTIONAL -- Need OP
    furtherExtendedWaitTime-r12        INTEGER (1..N)       OPTIONAL, -- Need ON
}
ReleaseCause ::=     ENUMERATED {loadBalancingTAUrequired,
                                 other, cs-FallbackHighPriority-v1020 , spare1}
(omitted for presentation)
-- ASN1STOP
```

RRCConnectionRelease field descriptions extendedWaitTime

Value in seconds for the wait time for Delay Tolerant access requests.
furtherExtendedWaitTime Value in seconds for the wait time for Application-specific access
control. (N can be 1800 or integer)

In the RRC connection release message, the ReleaseCause can be used to specify a cause of release: Application-specific accommodation control.

The RRC connection reject message and the RRC connection release message may be triggered by a MME. That is, overload control may be managed by the MME. In particular, using S1 interface message such as OVERLOAD START, the MME can restrict loads of eNBs (see, 3GPP TS 23.401, Section 4.3.7.4). After receiving OVERLOAD START message, eNB can reject RRC connection request from UEs with non-emergency and mobile originating service. Thus, it is also proposed that MME can include application specific overload control information in OVERLOAD START message requesting eNBs to restrict access from UEs with specific application as below.

4.3.7.4  MME control of overload (Proposed)
4.3.7.4.1  General
Using the OVERLOAD START message, the MME can request the eNodeB to:

-continued

Figure 13:
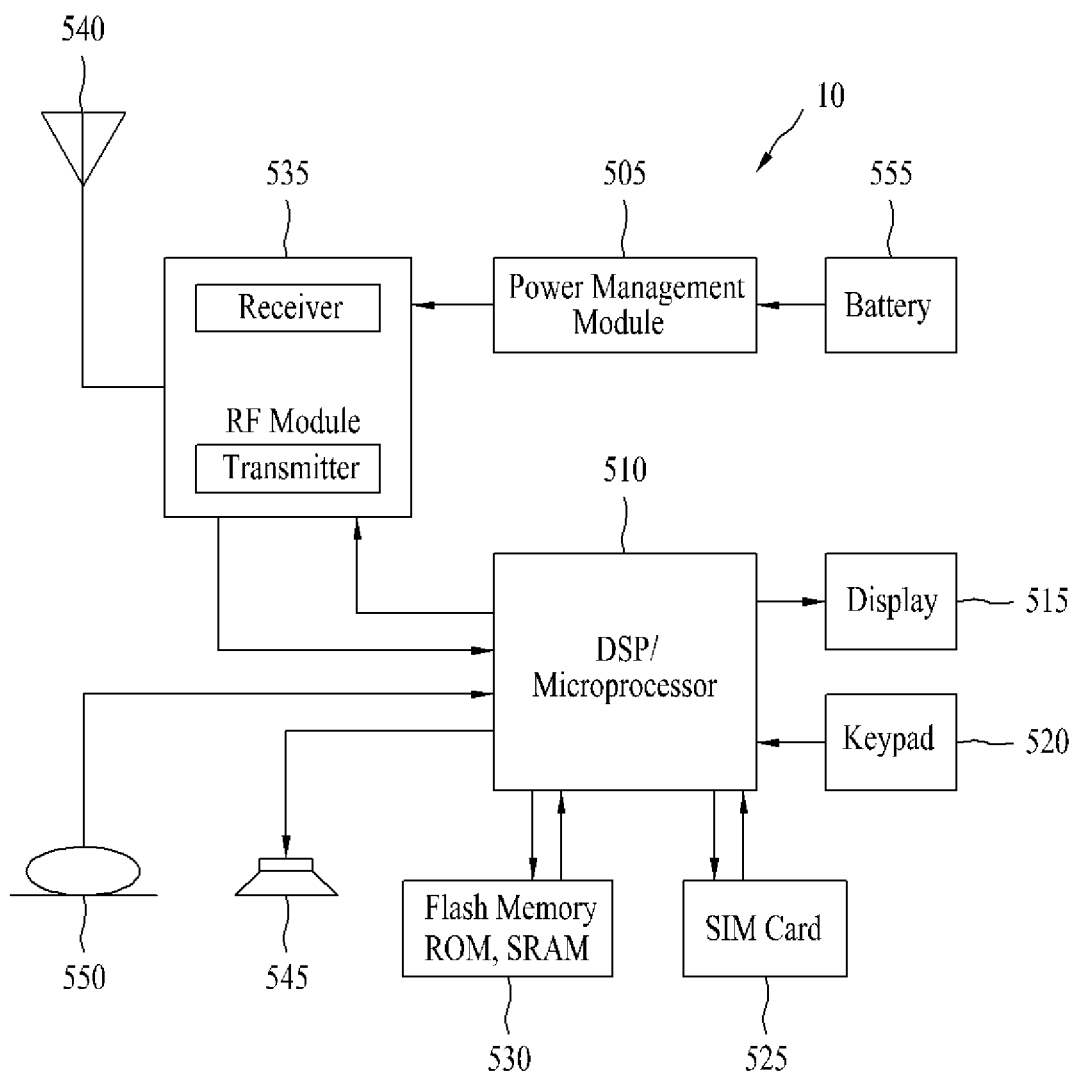
FIG. 13 illustrates a block diagram of a User Equipment (UE).

- reject RRC connection requests that are for non-emergency
  and non-high priority mobile originating services; or
- reject RRC connection requests that are for specific mobile
  originating application services; or
- notify the access barring of the UE with specific application
  service;

FIG. 13 illustrates a block diagram of a User Equipment (UE) 10. The UE 10 includes a processor (or digital signal processor) 510, RF module 535, power management module 505, antenna 540, battery 555, display 515, keypad 520, memory 530, SIM card 525 (which may be optional), speaker 545 and microphone 550. The block diagram can be also used as a block diagram of network nodes (e.g., eNB, MME).

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatus for controlling congestion, in particular user plane congestion.

The invention claimed is:

1. A method of controlling a network access by a User Equipment (UE) in a wireless communication system, the method comprising:
receiving, by the UE, system information including an Application-based (APP-based) information set,
wherein the APP-based information set includes one or more APP-based information subsets,
wherein each of the one or more APP-based information subsets includes priority information indicating a respective priority level per application, and
wherein the respective priority level is used to control network access per application;
receiving, by the UE, information indicating a threshold value for a priority level; and
performing, by the UE, a network access procedure for an application that needs a network access, if the received respective priority level of the application is equal to or higher than the threshold value,
wherein the UE skips the performance of the network access procedure for the application that needs the network access if the received respective priority level of the application is lower than the threshold value, and
wherein the application includes at least one of a web-browsing, an email, a file transfer, a social application and a messaging.

2. The method of claim 1, wherein each of the one or more APP-based information subsets further includes probability information and time information used for controlling the network access.

3. The method of claim 1, wherein the performing comprises:
transmitting a Radio Resource Control (RRC) connection request message,
wherein the RRC connection request message includes information identifying an application that causes a RRC connection establishment.

4. The method of claim 3, further comprising:
receiving a RRC connection reject message,
wherein the RRC connection reject message includes information indicating a time interval, and
wherein the time interval is used to prevent the application from restarting the network access procedure.

5. The method of claim 4, wherein the RRC connection reject message is triggered by a mobility management entity (MME).

6. The method of claim 1, further comprising:
receiving a RRC connection release message,
wherein the RRC connection release message includes information indicating a time interval, and
wherein the time interval is used to prevent the application from restarting the network access procedure.

7. The method of claim 6, wherein the RRC connection release message is triggered by a mobility management entity (MME).

8. A User Equipment (UE) configured to control a network access in a wireless communication system, the UE comprising:
a radio frequency (RF) unit; and
a processor configured to:
control the RF unit to receive system information including an Application-based (APP-based) information set,
wherein the APP-based information set includes one or more APP-based information subsets,
wherein each of the one or more APP-based information subsets includes priority information indicating a respective priority level per application, and
wherein the respective priority level is used to control network access per application,
control the RF unit to receive information indicating a threshold value for a priority level, and
for an application that needs a network access, perform a network access procedure for the application, if the received respective priority level of the application is equal to or higher than the threshold value,
wherein the processor is further configured to skip the network access procedure for the application that needs the network access if the received respective priority level of the application is lower than the threshold value, and
wherein the application includes at least one of a web-browsing, an email, a file transfer, a social application and a messaging.

9. The UE of claim 8, wherein each of the one or more APP-based information subsets further includes probability information and time information used for controlling the network access.

10. The UE of claim 8, wherein the processor is further configured to:
transmit a Radio Resource Control (RRC) connection request message,
wherein the RRC connection request message includes information identifying an application that causes a RRC connection establishment.

11. The UE of claim 10, wherein the processor is further configured to:
receive a RRC connection reject message,
wherein the RRC connection reject message includes information indicating a time interval, and
wherein the time interval is used to prevent the application from restarting the network access procedure.

12. The UE of claim 11, wherein the RRC connection reject message is triggered by a mobility management entity (MME).

13. The UE of claim 8, wherein the processor is further configured to:
receive a RRC connection release message,
wherein the RRC connection release message includes information indicating a time interval, and
wherein the time interval is used to prevent the application from restarting the network access procedure.

14. The UE of claim 13, wherein the RRC connection release message is triggered by a mobility management entity (MME).

* * * * *